Jan. 22, 1924.

J. ELKINS 1,481,544

LUBRICATOR

Filed April 24, 1922

Inventor.
JOSEPH ELKINS.
By
Atty.

Patented Jan. 22, 1924.

1,481,544

UNITED STATES PATENT OFFICE.

JOSEPH ELKINS, OF BLYTHEVILLE, ARKANSAS.

LUBRICATOR.

Application filed April 24, 1922. Serial No. 556,293.

*To all whom it may concern:*

Be it known that I, JOSEPH ELKINS, a citizen of the United States, residing at Blytheville, county of Mississippi, and State of Arkansas, have invented a certain new and useful Improvement in Lubricators, of which the following is a full, clear, and exact description, such as will enable others skilled in the art to which it appertains to make and use the same, reference being had to the accompanying drawings, forming part of this application.

My invention relates to lubricating devices for axle shafts and other journals, and the main object of my invention is to provide lubricant applying means which may be fed from a lubricant reservoir spaced from the applying means.

I desire to so feed and apply the lubricant that the journal will receive a constant supply which is evenly distributed over the journal surface.

Other incidental objects of my invention will appear from the following description thereof and inspection of the accompanying drawings which form a part of the specification and in which—

Figure 1:
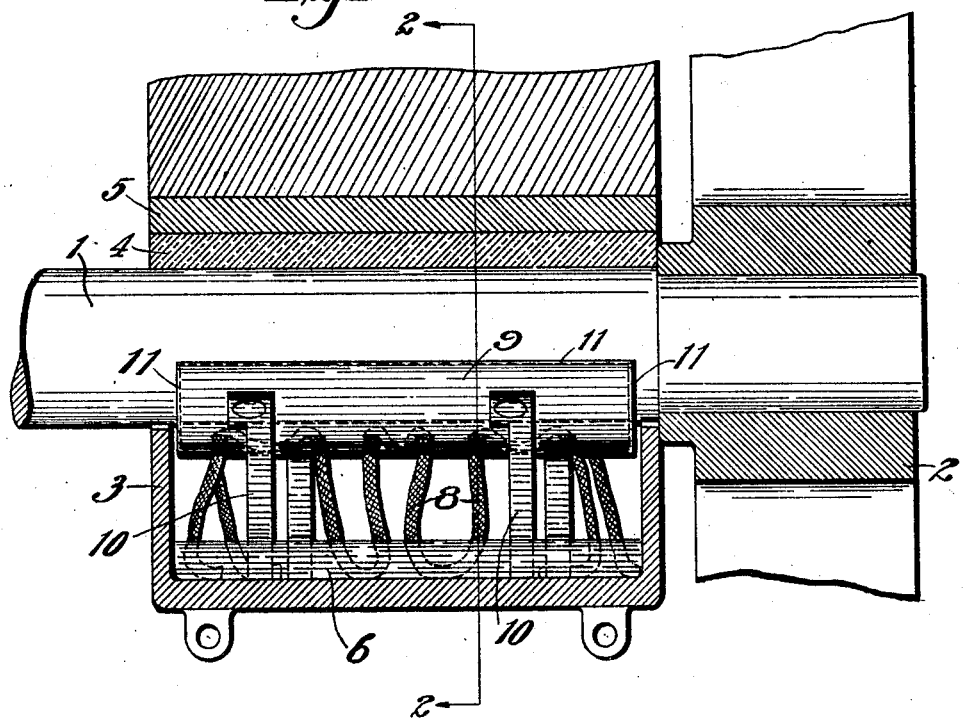
Figure 1 is a vertical longitudinal section through a journal and journal box equipped with my lubricator.
Figure 2:
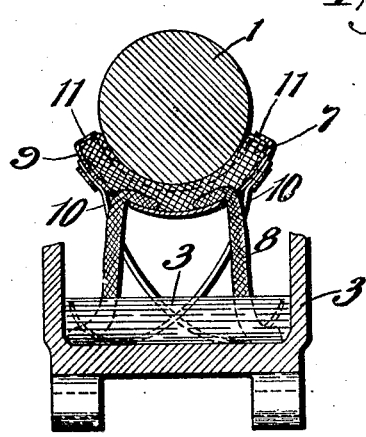
Figure 2 is a vertical transverse section taken substantially on line 2—2 of Figure 1.

The journal is indicated at 1, the hub of a wheel at 2, and a journal box at 3 is provided with a bearing 4 and shim 5. The lower portion of box 3 forms a reservoir for the lubricant 6 which is supplied to the surface of journal 2 by means of an elevated pad 7 and pad feeding means comprising cotton wicks 8, the pad being yieldingly supported in journal contacting position by means of a concave sheet metal pan 9 mounted upon arcuate spring-like legs 10.

The edges 11 of pan 9 are flanged inwardly as illustrated to engage the adjacent edges of pad 7 and prevent relative movement of the latter such as is likely to be caused by rotation of the journal and longitudinal shifting thereof.

Any wear on the journal or the bearing 4 will be compensated for by the elastic quality of spring legs 10 which are so shaped as to support the pan irrespective of the contour of the interior bottom of the box or the distance between the latter and the journal.

The wicks 8 extend from the lubricant 3 through perforations in the bottom of pan 9, to the lower face of the pad, thence longitudinally of pad 7 a short distance, thence downwardly into the lubricant again. It will be understood that pad 7 is of felt or similar porous material whereby the lubricant rising to the pad by capillary attraction is distributed over the entire pad surface. This arrangement of the wick and pad avoids undue pressure on any point, especially of the wicks, thereby restricting the passage of the lubricant and stopping its circulation.

The device shown comprises a simple unitary assembly which may be inserted in various types and sizes of boxes without adjustment other than that possessed by the flexible supports. The disposition of the supports 10 and wicks 8 on opposite sides of the journal center line render the device equally efficient irrespective of the direction of rotation of the journal.

Various modifications in the details and arrangement of the parts shown may be made without departing from the spirit of my invention as expressed in the appended claims.

I claim:

1. In a lubricant feeding device for a car journal box, an arcuate pan, a pad carried thereby, wicks depending from said pan into the bottom of the journal box, and yielding supporting means for said pad and pan comprising leaf springs secured to the sides of said pan extending diagonally downwardly therefrom to the opposite side of the reservoir and each terminating in an upwardly curved foot adapted to engage the bottom and one side of the journal box.

2. In an axle lubricator, a lubricant reservoir, a perforated pan supported above the bottom of the reservoir, a wick extending from the lower portion of said reservoir upwardly through a perforation in said pan along the inside surface of the latter and then downwardly through another perforation in said pan into the lower portion of said reservoir, and a pad of felt or the like carried by said pan and resting on top of the portions of said wick which are inside of the pan so as to be removable from said pan independently of said wick.

3. In an axle lubricating device, a concave pad for contacting with the axle, a concave pan supporting said pad, wicks in contact with said pad and extending downwardly through said pan, a lubricant reservoir receiving the depending portions of said wicks, and springs secured respectively to the sides of said pan extending longitudinally diagonally downwardly so as to cross each other transversely of the axis of the device with their lower ends terminating beneath the sides of the pan opposite to those sides to which their upper ends are secured and adjacent the sides of the lubricant reservoir, said springs forming a support for said pan and pad adapted to yield vertically but to resist tilting or lateral movement of the same.

In testimony thereof I hereunto affix my signature this 17th day of April, 1922.

JOSEPH ELKINS.